US010612580B2

(12) United States Patent  
Neal et al.

(10) Patent No.: US 10,612,580 B2  
(45) Date of Patent: Apr. 7, 2020

(54) DIFFUSION BONDED FASTENER ASSEMBLY

(71) Applicants: Matthew A. Neal, Palmdale, CA (US); Charles R. Smith, Acton, CA (US)

(72) Inventors: Matthew A. Neal, Palmdale, CA (US); Charles R. Smith, Acton, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 246 days.

(21) Appl. No.: 15/855,725

(22) Filed: Dec. 27, 2017

(65) Prior Publication Data

US 2018/0135685 A1  May 17, 2018

Related U.S. Application Data

(62) Division of application No. 14/728,671, filed on Jun. 2, 2015, now Pat. No. 9,897,132.

(51) Int. Cl.
  *F16B 39/22*  (2006.01)
  *B23K 20/02*  (2006.01)
  (Continued)

(52) U.S. Cl.
  CPC ........... *F16B 39/225* (2013.01); *B21J 15/022* (2013.01); *B23K 20/023* (2013.01);
  (Continued)

(58) Field of Classification Search
  CPC ........ F16B 39/225; F16B 19/08; F16B 19/05; F16B 19/06; B21J 15/022; B23K 20/023;
  (Continued)

(56) References Cited

U.S. PATENT DOCUMENTS 1,708,799 A * 4/1929 Norwood ................ F16B 39/24  
411/159  
2,482,391 A    9/1949 Webster  
(Continued)

FOREIGN PATENT DOCUMENTS

EP    2796734    10/2014  
GB    2058990    4/1981  
(Continued)

*Primary Examiner* — David P Bryant  
*Assistant Examiner* — Nirvana Deonauth  
(74) *Attorney, Agent, or Firm* — Tarolli, Sundheim, Covell & Tummino LLP

(57) ABSTRACT

A fastener assembly includes a bolt having a shaft and a head. The shaft has proximal and distal shaft ends and a shaft body, with the head at the proximal shaft end. At least a bondable portion of the shaft body is at least partially made of a bondable material. At least one collar has proximal and distal collar ends longitudinally separated by a collar body which includes a longitudinally oriented collar aperture extending through a thickness thereof between proximal and distal collar surfaces. The collar aperture defines an inner collar wall having a bondable portion which is at least partially made of a bondable material. At least the bondable portion of the shaft body is located inside the collar aperture. The bondable material of both of the inner collar wall and the shaft body is activated to bond the shaft and the collar into an integral fastener assembly structure.

11 Claims, 4 Drawing Sheets

(51) Int. Cl.
    *F16B 19/08*   (2006.01)
    *B23K 20/12*   (2006.01)
    *B23K 20/22*   (2006.01)
    *B21J 15/02*   (2006.01)
    *B23K 101/18*  (2006.01)
    *F16B 19/05*   (2006.01)
    *F16B 19/06*   (2006.01)

(52) U.S. Cl.
    CPC .......... *B23K 20/1295* (2013.01); *B23K 20/22* (2013.01); *F16B 19/08* (2013.01); *B23K 2101/18* (2018.08); *F16B 19/05* (2013.01); *F16B 19/06* (2013.01)

(58) Field of Classification Search
    CPC . B23K 20/1295; B23K 20/22; B23K 2101/18
    See application file for complete search history.

(56) References Cited

U.S. PATENT DOCUMENTS

| | | | |
|---|---|---|---|
| 3,142,088 A | 7/1964 | Cravath | |
| 3,179,143 A * | 4/1965 | Schultz | F16B 39/225 411/82.2 |
| 3,680,429 A * | 8/1972 | Briles | B21J 15/02 411/504 |
| 3,685,391 A | 8/1972 | Gapp et al. | |
| 3,848,389 A | 11/1974 | Gapp et al. | |
| 3,854,030 A | 12/1974 | Roye | |
| 4,975,006 A | 12/1990 | Swanson | |
| 4,987,714 A | 1/1991 | Lemke | |
| 5,213,460 A | 5/1993 | Sadri et al. | |
| 5,333,980 A | 8/1994 | Pratt et al. | |
| 5,672,036 A | 9/1997 | Medal | |
| 6,146,075 A | 11/2000 | Delangis | |
| 6,702,535 B1 | 3/2004 | Stevenson et al. | |
| 2005/0224655 A1 | 10/2005 | Guittard et al. | |
| 2013/0333165 A1 | 12/2013 | Prest et al. | |
| 2014/0123470 A1 | 5/2014 | Miles et al. | |
| 2014/0234053 A1 * | 8/2014 | Martin | F16B 19/002 411/508 |
| 2015/0016920 A1 | 1/2015 | Yamazaki | |
| 2015/0222027 A1 | 8/2015 | Dupuis et al. | |
| 2016/0271723 A1 | 9/2016 | Harada et al. | |

FOREIGN PATENT DOCUMENTS

| | | |
|---|---|---|
| JP | S63299876 | 12/1988 |
| JP | S63299877 | 12/1988 |
| WO | 2000028221 | 5/2000 |

* cited by examiner

DIFFUSION BONDED FASTENER ASSEMBLY

RELATED APPLICATION

This application is a divisional of U.S. patent application Ser. No. 14/728,671, filed 2 Jun. 2015 and titled "Diffusion Bonded Fastener Assembly", the subject matter of which is incorporated herein by reference in its entirety.

TECHNICAL FIELD

This disclosure relates to an apparatus and method for use of a diffusion bonded fastener assembly and, more particularly, to a diffusion bonded fastener assembly including at least two component parts formed into an integral, unitary whole.

BACKGROUND

Current aircraft production pace may be adversely affected by unavailability of sufficiently durable, reliable, and uniform fasteners for attaching various parts of the aircraft together. Fastener production throughput may be limited by the machines, operations, and subsequent quality assurance efforts that must be configured and used for a fastener production run.

For example, production and testing efforts are taken in traditional fastener manufacturing to ensure proper grain boundary control in the bulk metal. Attaining the desired grain boundaries for a particular fastener design may involve multiple machining and inspection steps, each of which adds time and cost to the manufacturing process. The grain boundary considerations, particularly the grain boundaries around load-bearing and contacting surfaces of fasteners, may be of concern to one of ordinary skill in the art at least because grain boundaries offer sites for propagation of corrosion, defects, stress concentrations, and fatigue.

There are currently two main bolt-type fasteners used in aircraft use environments: (1) threaded, and (2) swaged systems. Both of these types of bolt-type fasteners rely on a relatively large amount of surface contact (via friction or mechanical lock, respectively, on a thread) to provide sufficient holding torque for a particular use application. Clamp-up of a threaded fastener system may be susceptible to corruption/error due to contamination, improper part geometry (e.g., slight nonconformances, misalignment during installation), installation methods, and the like. Clamp-up of a swaged fastener relies upon the ability of relatively soft materials to be effectively "crushed" into place, in addition to the error sources present with threaded fasteners.

Because of variable clamp-up results in these known systems, designers cannot effectively rely upon fasteners being useful in the field up to the "perfect condition" fastening strengths theoretically available, and therefore fastened assemblies are often conservatively designed, even overdesigned. As a result, there are generally more and/or larger traditional threaded and/or swaged fasteners provided than would be needed with more reliable clamp-up results, and the final design is more expensive and heavier than they would need to be if the clamp-up forces were more predictable and regulated.

In addition, traditional threaded or swaged fasteners generally have "revolved" (i.e., rotationally symmetrical) shapes, due to the relative ease of machining those shapes as compared to non-revolved shapes). Particularly when exposed to vibration or shock, revolved-shaped fasteners tend to rotate, which can lead to degradation of coatings and paint applications and increased wear. This "creep" or "loosening" can cause a swage collar or threaded nut to eventually work its way loose from the bolt, causing potential failure of the fastener system.

SUMMARY

A method of installing a fastener assembly on a substrate having a longitudinally oriented substrate aperture extending through a thickness thereof between proximal and distal substrate surfaces is described. A bolt is provided, the bolt having a shaft and a head. The shaft has proximal and distal shaft ends longitudinally separated by a shaft body. The head is located at the proximal shaft end. At least a bondable portion of the shaft body spaced from the proximal shaft end is at least partially made of a bondable material. The distal shaft end of the bolt is inserted longitudinally into the substrate aperture from the proximal substrate surface. The distal shaft end of the bolt is extended from the distal substrate surface with at least a portion of the bondable portion of the shaft body being located distal to the distal substrate surface. At least one collar having proximal and distal collar ends longitudinally separated by a collar body is provided. The collar body includes a longitudinally oriented collar aperture extending through a thickness thereof between proximal and distal collar surfaces. The collar aperture defines an inner collar wall having a bondable portion which is at least partially made of a bondable material. The distal shaft end of the bolt is inserted longitudinally into the collar aperture from the proximal collar surface. The distal shaft end of the bolt is extended into the collar aperture with the bondable portion of the shaft body being at least partially located lateral to the bondable portion of the inner collar wall. The bondable material of both of the inner collar wall and the shaft body is activated. The shaft and the collar are bonded into an integral fastener assembly structure through activation of the bondable material.

A fastener assembly is disclosed. A bolt has a shaft and a head. The shaft has proximal and distal shaft ends longitudinally separated by a shaft body. The head is located at the proximal shaft end. At least a bondable portion of the shaft body spaced from the proximal shaft end is at least partially made of a bondable material. At least one collar has proximal and distal collar ends longitudinally separated by a collar body. The collar body includes a longitudinally oriented collar aperture extending through a thickness thereof between proximal and distal collar surfaces. The collar aperture defines an inner collar wall having a bondable portion which is at least partially made of a bondable material. At least the bondable portion of the shaft body is located inside the collar aperture, laterally adjacent to the bondable portion of the inner collar wall. The bondable material of both of the inner collar wall and the shaft body is activated to bond the shaft and the collar into an integral fastener assembly structure.

A mechanical assembly is disclosed. A fastener assembly includes a bolt having a shaft and a head. The shaft has proximal and distal shaft ends longitudinally separated by a shaft body. The head is located at the proximal shaft end. At least a bondable portion of the shaft body spaced from the proximal shaft end is at least partially made of a bondable material. At least one collar has proximal and distal collar ends longitudinally separated by a collar body. The collar body includes a longitudinally oriented collar aperture extending through a thickness thereof between proximal and distal collar surfaces. The collar aperture defines an inner collar wall having a bondable portion which is at least partially made of a bondable material. At least one substrate has a longitudinally oriented substrate aperture extending through a thickness thereof between proximal and distal substrate surfaces. The shaft body of the bolt is located at least partially laterally within the substrate aperture with the distal shaft end of the bolt extending from the distal substrate surface with at least a portion of the bondable portion of the shaft body being located distal to the distal substrate surface. The shaft body of the bolt is located at least partially laterally within the collar aperture with the bondable portion of the shaft body being at least partially located lateral to the bondable portion of the inner collar wall. The bondable material of both of the inner collar wall and the shaft body is activated to bond the shaft and the collar into an integral fastener assembly structure.

BRIEF DESCRIPTION OF THE DRAWINGS

For a better understanding, reference may be made to the accompanying drawings, in which.

DESCRIPTION OF ASPECTS OF THE DISCLOSURE

This technology comprises, consists of, or consists essentially of the following features, in any combination.

Figure 1:
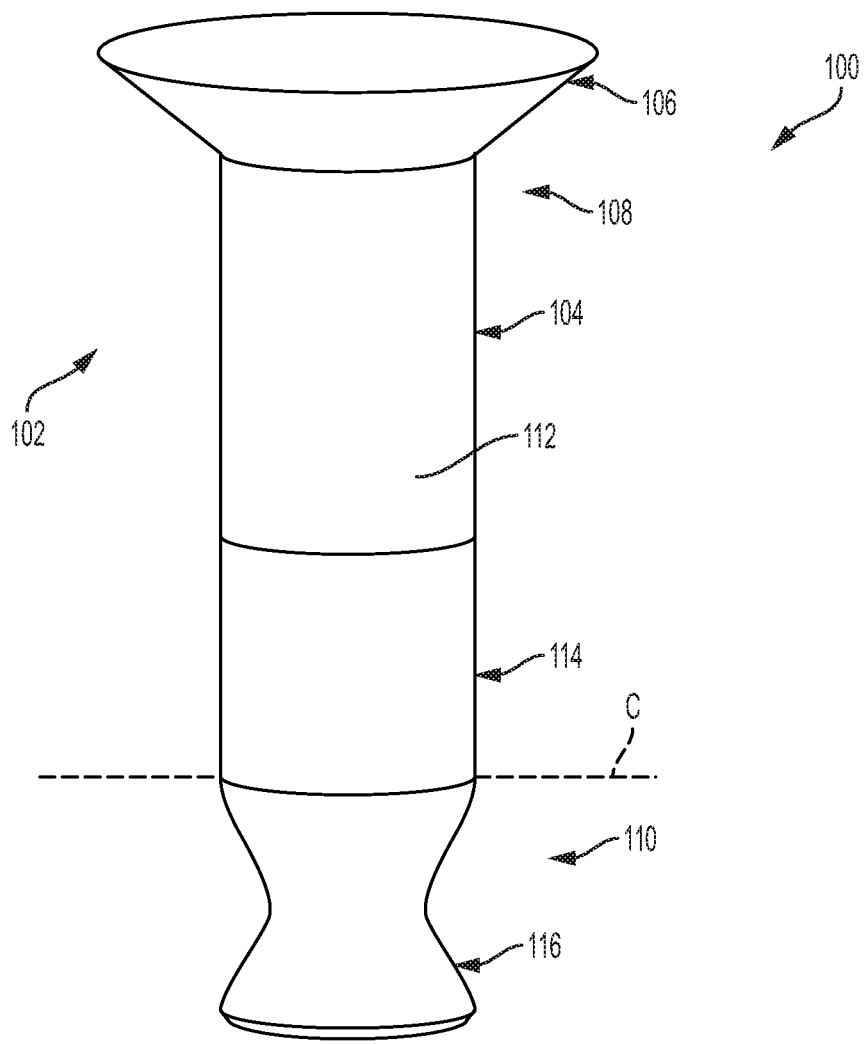
FIG. 1 is a partial side view of one aspect of the disclosure.

FIG. 1 depicts a portion of a mechanical assembly, the portion being shown here as a fastener assembly 100. The component shown in FIG. 1 is a bolt 102 having a shaft 104 and a head 106. The term "bolt" is used herein to describe a fastening component having a shaft 104 and a head 106, which interacts with a second component, as described below, to comprise a fastener assembly 100. A "bolt" 102 may have a shaft 104 which is at least partially threaded, or instead has a smooth, rod- or dowel-like surface. The bolt 102 may interact in any desired manner with any desired threaded and/or unthreaded structures (as part of the fastener assembly 100 and/or as the structures being fastened together), and may be provided by one of ordinary skill in the art for any desired purpose.

The shaft 104 of the bolt 102 has proximal and distal shaft ends 108 and 110, respectively, longitudinally separated by a shaft body 112. The shaft body 112 is shown here as being "revolved" (i.e., rotationally symmetrical) and cylindrical, but could have any suitable cross-sectional shape including, but not limited to, asymmetrical, rectilinear, curved, and curvilinear. The cross-sectional shape of the shaft body 112 could vary at different longitudinal locations along the shaft 104. For example, the length of the shaft body 112 could be tapered laterally outward, or laterally inward, from the initial shaft body 112 diameter at the proximal shaft end 108. The term "lateral" is used herein to indicate a direction substantially within a plane perpendicular to the longitudinal direction.

The head 106 is located at the proximal shaft end 108, and may be of any suitable type for a particular use environment. For example, the head 106 may be countersunk, counterbored, pan head, flat head, round head, oval head, fillister head, binding head ("straight side"), truss head, holt head, one-way head, Phillips finishing washer head, washer head, undercut flat or oval head, flat head (100° countersunk), square shoulder, indented hexagon, indented hexagon washer head, acorn head, hexagon head (whether or not trimmed), welding screw Type "U" (Underlug) or Type "T" (Overlug), any combination of these, or have any other desired configuration for a particular use application. Similarly, the head 106 may have any desired driving interface feature (not shown), such as, but not limited to, slotted, Phillips, Pozidriv/SupaDriv, square, Robertson, external hex, internal/socket hex, security hex (A.K.A. "pin-in-hex"), Torx, security Torx, tri-wing, Torq-set, spanner head, clutch, one-way clutch, double-square, triple-square, polydrive, spline, double hex, Bristol, Pentalobe, any combination of these, or have any other desired configuration for a particular use application.

At least a portion of the shaft body 112 spaced from the proximal shaft end 108 is a bondable portion 114 which is at least partially made of a bondable material. Optionally, any or all of the bolt 102 may be made of a bondable material. The term "bondable material" is used herein to indicate a material which is amenable to attachment to another (same or different) material via a diffusion bonding process. Diffusion bonding is a process for joining two components which involves no liquid fusion or filler metal. No weight is added to the total, and the diffusion bonded join tends to exhibit both the strength and temperature resistance of the base material(s). The materials endure no, or very little, plastic deformation; very little residual stress is introduced; and there is little or no contamination from the bonding process. Diffusion bonding may be performed on a join surface of theoretically any size with no increase in processing time; practically speaking, the surface tends to be limited by the pressure required and physical limitations of the diffusion bonding process and associated machinery. Diffusion may be performed, for example, with similar and dissimilar metals, reactive and refractory metals, and/or pieces of varying thicknesses. An example of a bondable material is an amorphous metal, such as those available from Liquidmetal Technologies, Inc. of Rancho Santa Margarita, Calif. The term "bondable", as used herein, does not encompass a strictly adhesive (e.g., glue or other "sticky" added material) connection scheme which does not use a "bondable material".

An amorphous metal (also known as "metallic glass" or "glassy metal") is a solid metallic material, usually an alloy, with a disordered atomic-scale structure. Most metals are crystalline in their solid state, which means they have a highly ordered arrangement of atoms. Amorphous metals are non-crystalline, and have a glass-like structure. Unlike common glasses (such as window glass), which are typically insulators, amorphous metals have good electrical conductivity. There are several ways in which amorphous metals can be produced, including extremely rapid cooling, physical vapor deposition, solid-state reaction, ion irradiation, and mechanical alloying.

Amorphous metal is usually an alloy rather than a pure metal. The amorphous metal alloys contain atoms of significantly different sizes, leading to low free volume (and therefore up to orders of magnitude higher viscosity than other metals and alloys) in molten state. The viscosity prevents the atoms from moving enough to form an ordered lattice. This material structure also results in low shrinkage during cooling, and resistance to plastic deformation. The absence of grain boundaries—the "weak spots" of crystalline materials—leads to better resistance to wear and corrosion than in traditional crystalline materials. Amorphous metals, while technically glasses, are also much tougher and less brittle than oxide glasses and ceramics. The thermal conductivity of amorphous materials is lower than that of crystalline metal.

The bondable portion 114 of the bolt 102 is shown in FIG. 1 as being a "band" or "collar" about a portion of the shaft 104. The bondable portion 114 could be provided to the shaft 104 in any desired manner, and could be located merely on the shaft 104 surface, or could extend any radial distance into (including comprising an entire cross-sectional thickness of) the shaft body 112. While the bondable material forming the bondable portion 114 is shown in the Figures as being a complete ring around the circumference of the shaft body 112, it is also contemplated that the bondable portion 114 could instead include multiple patches or areas (not shown), having any desired shape(s) or other physical characteristics and being at any desired spacing/locations on the bolt 102, as desired for a particular use environment. It is contemplated, however, that for most use environments of the fastener assembly 100, the bondable portion 114 will be permanently attached to the other structures of the bolt 102.

The bolt 102 is shown in FIG. 1 as including an optional pulling section 116, located at the distal shaft end 110 and configured to transfer a longitudinally tensile force to the shaft 104, as described below. In the Figures, the pulling section 116 is shown as a uniform, revolved (i.e., rotationally symmetrical) gradually reduced-diameter area of the shaft body 112 which allows an outside tool or other structure to securely grasp the shaft 104. However, any suitable pulling section 116, including, but not limited to, a more abrupt shoulder, a tapered section interacting with a collet, a throughhole or other aperture extending at any desired angle into and/or through the shaft body 112, a magnetically-engageable feature, any combination thereof, or the like could be provided by one of ordinary skill in the art for a particular use environment. However, the distal shaft end 110 could instead be straight-sided, with no pulling section 116.

Figure 2:
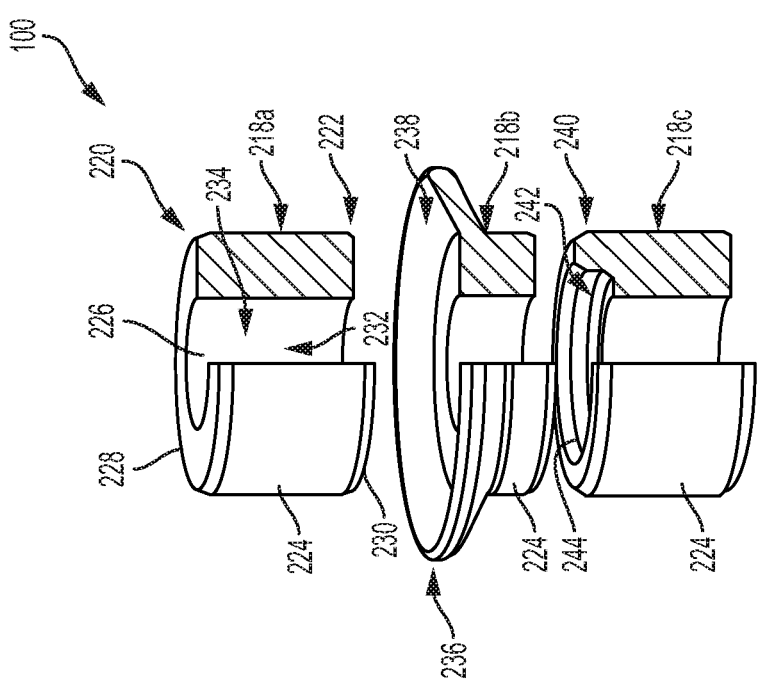
FIG. 2 is a partial side view of various options which can be used with the aspect of FIG. 1.

Turning to FIG. 2, another component of the fastener assembly 100 is shown in a partial cutaway view, including various example configurations. FIG. 2 depicts three options for collars 218a, 218b, and 218c which can be used, individually and/or together and in any "stacking" order, for a particular use environment of the fastener assembly 100. The uppermost collar 218a in FIG. 2 is a basic "straight" collar 218a, which has proximal and distal collar ends 220 and 222, respectively, longitudinally separated by a collar body 224. The collar body 224 includes a longitudinally oriented collar aperture 226 extending through a thickness thereof between proximal and distal collar surfaces 228 and 230, respectively. The collar aperture 226 defines an inner collar wall 232 having a bondable portion 234 which is at least partially made of a bondable material.

The bondable portion 234 of the inner collar wall 232 may be made from a bondable material which the same as, or different from, the bondable material of the bondable portion 114 of the bolt 102. For ease of description, the entire collar 218a will be presumed herein to be made of a bondable material, and thus, the entire inner collar wall 232 can be considered to be a bondable portion 234. However, it is contemplated that, like the bolt 102, the bondable portion 234 of the collar 218a could instead include multiple patches or areas (not shown), having any desired shape(s) or other physical characteristics and being at any desired spacing/ locations on the collar 218a, as desired for a particular use environment. It is contemplated, however, that for most use environments of the fastener assembly 100, the bondable portion 234 will be permanently attached to the other structures of the collar 218a.

For simplicity, description of common elements and operation similar to those in the previously described collar 218a will not be repeated with respect to the remaining collars 218b and 218c in FIG. 2, and element numbers common to the three types of collars 218a, 218b, and 218c will not be repeated in FIG. 2.

Spring collar 218b includes a spring washer 236, which here is shown as being formed as a single piece with the collar body 224 but which could be separately provided. The spring washer 236 has a spring washer aperture 238 extending longitudinally therethrough. When present, the spring washer 236 can act as a Belleville washer (A.K.A., a "disc spring") to help exert a desired clamp-up force to the fastener assembly 100, as will be discussed below.

Insulating collar 218c includes an insulating washer 240, which here is shown as being formed as a single piece with the collar body 224 but which could be separately provided. The insulating washer 240 has an insulating washer aperture 242 extending longitudinally therethrough. For most use environments of the present invention, the insulating washer aperture 242 will have a larger cross-sectional area than an adjacent collar aperture 226 to provide a "shoulder" feature, as shown in FIG. 2. When present, the insulating washer 240 can provide an air gap 244 (at/near that "shoulder") between longitudinally stacked components, as will be discussed below.

It is contemplated that the inner collar wall 232 will have a complementary profile/configuration to at least the bondable portion 114 of the shaft body 112, for reasons which will shortly become apparent. However, one of ordinary skill in the art can readily configure the shaft body 112, the inner collar wall 232, the spring washer aperture 238, the insulating washer aperture 242, or any other components of the fastener assembly 100 as desired for a particular use environment.

Figure 3A:
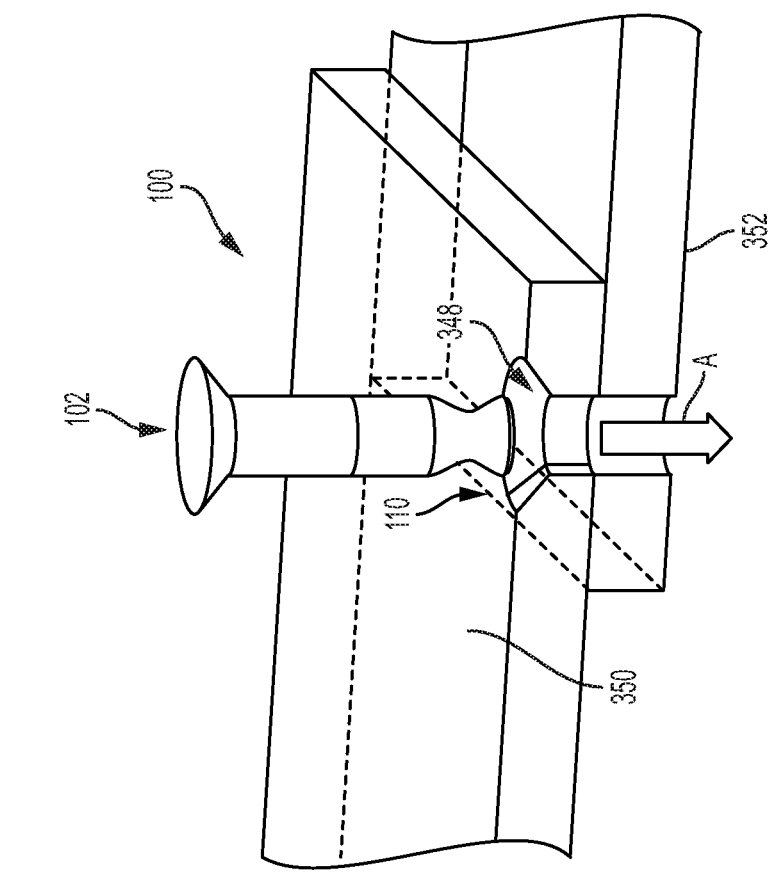
FIGS. 3A-3C schematically depict a portion of a sequence of operation of the aspect of FIG. 1.
Figure 3C:
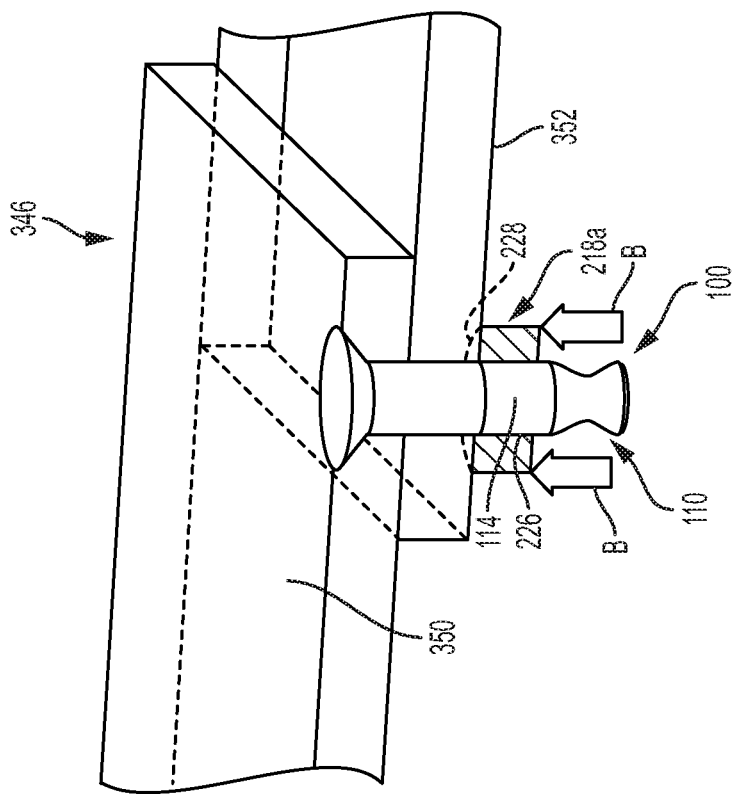
Figure 3B:
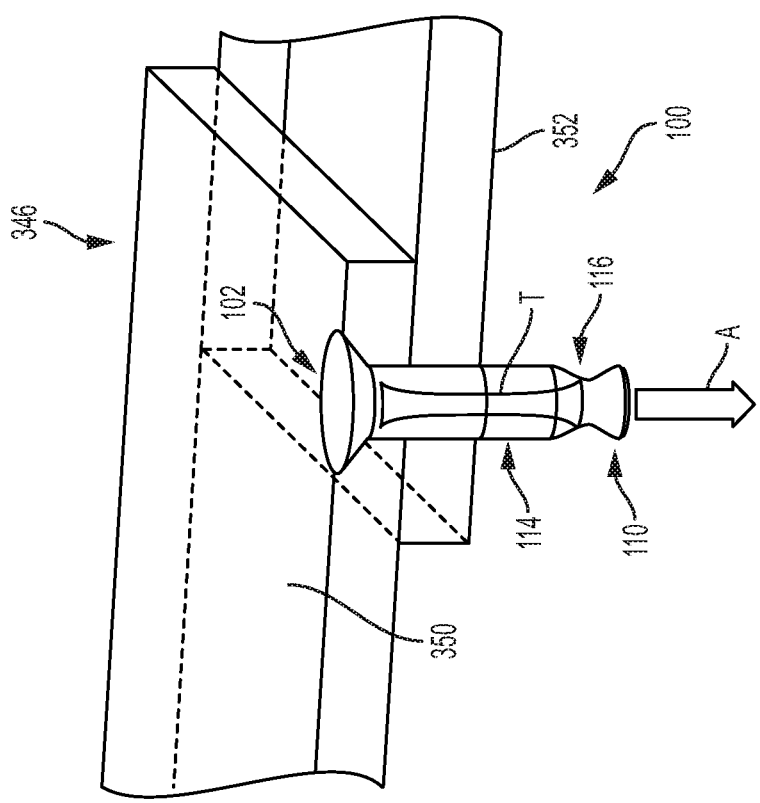

FIGS. 3A-3C depict a sequence of operation of the fastener assembly 100 as part of a mechanical assembly. In FIGS. 3A-3C, at least one substrate 346 is provided. Here, the substrate 246 comprises two stacked/laminated materials which are desired to be fastened together with the fastener assembly 100, though any suitable substrate 246 could be used with the fastener assembly 100. The substrate 346 includes a longitudinally oriented substrate aperture 348 extending through a thickness thereof between proximal and distal substrate surfaces 350 and 352, respectively.

In FIG. 3A, the substrate aperture 348 is depicted as a countersunk hole which is present in the substrate 346 before the fastener assembly 100 is provided. However, it is contemplated that the substrate aperture 348 may instead be at least partially formed by action of the bolt 102 (e.g., when the bolt 102 is a self-drilling screw) and may be absent or a relatively small "pilot hole" type aperture which is created or enlarged by insertion of the bolt 102 into the substrate 346. The substrate aperture 348 may have any desired revolved or non-revolved shape, and may have a constant or variable cross-sectional shape along the length thereof, as desired for a particular use environment.

As shown in FIG. 3A, the distal shaft end 110 of the bolt 102 is inserted longitudinally (i.e., as indicated by arrow A) into the substrate aperture 348 from the proximal substrate surface 350. As shown in FIG. 3B, the shaft body 112 then penetrates into the substrate aperture 348 until the distal shaft end 110 of the bolt 102 extends from (i.e., longitudinally beyond) the distal substrate surface 352 with at least a portion of the bondable portion 114 of the shaft body 112 is located distal to the distal substrate surface 352.

This insertion of the shaft body 112 into the substrate aperture 348 may be aided, particularly when the substrate aperture 348 is very close in dimensions to the shaft body 112, such as through the use of the optional pulling section 116 previously mentioned. A longitudinally tensile force (i.e., along arrow A) may be selectively applied to the shaft 104 through interaction of a tension source (not shown, but optionally a pliers, grasper, a tapered collet, or any other force-applying structure) with the pulling section 116. Alternately, when no pulling section 116 is present (i.e., the distal shaft end 110 is significantly "straight-sided" or otherwise relatively undifferentiated from adjacent portions of the shaft body 112), the longitudinally tensile force could be applied directly to the shaft body 112 in any suitable manner.

This longitudinally tensile force, when present, will tend to slightly reduce the lateral cross-sectional area of the shaft 104 via elastic deformation, as shown schematically in FIG. 3B by superimposed tensile diagram T. For example, the inner wall of the substrate aperture 348 and/or the proximal substrate surface 350 may press against a surface of the bolt 102 and thereby resist insertion of the shaft 104 into the substrate aperture 348. The slightly reduced lateral cross-sectional area provided by the longitudinally tensile force, when present, will facilitate the insertion of at least a portion of the shaft 104 through the substrate aperture 348.

Once the bolt 102 has been inserted into the substrate aperture 348 as desired, with at least a portion of the shaft 104 located laterally within the substrate aperture 348, the longitudinally tensile force may be released, allowing the shaft 104 to "spring back" toward its original lateral cross-sectional shape. Particularly if the relative lateral dimensions of the shaft 104 and the substrate aperture 348 are chosen to be close or even slightly overlapping, this "spring back" resulting from the release of the longitudinally tensile force will facilitate an interference fit ("frictional engagement") between the shaft 104 and the inner wall of the substrate aperture 348.

Optionally, and particularly when a pulling section 116 has been provided, a portion of the shaft body 112 at or near the distal shaft end 110 could be removed, in any desired manner, to prevent unwanted protrusion of the shaft body 112 from the distal substrate surface 352. For example, the pulling section 116 could be cut or snapped off from the remaining portion of the distal shaft end 110 along dashed cut line C in FIG. 1. This removal of the pulling section 116, or any other portion of the shaft body 112, could occur at any time after the bolt 102 has been inserted into the substrate aperture 348, and any suitable interference fit relationship established, as desired.

Turning to FIG. 3C, the bolt 102 has been "installed" within the substrate aperture 348 as desired, such that the substrate 346 at least partially surrounds the shaft body 112 (i.e., the bolt 102 is located at least partially laterally within the substrate aperture 348). Any desired interference fit between the bolt 102 and the substrate 348 has been established. A collar 218 (which may be one or more of collars 218a, 218b, and 218c) is now placed about a portion of the shaft 104 extending from the distal substrate surface 352. In other words, the distal shaft end 110 of the bolt is inserted longitudinally into the collar aperture 226 from the proximal collar surface 228, as indicated by arrows "B" in FIG. 3C. Optionally, the collar 218 may be "installed" on the bolt 102 with sufficient force to bring the proximal collar surface 228 and the distal substrate surface 352 into compressive contact, to "preload" the fastener assembly 100.

Whether or not a pulling section 116 is present on the shaft 104 at the time, a longitudinally tensile force may be selectively applied to the shaft 104 during the insertion of the shaft 104 into the collar 218 to facilitate an interference fit between the shaft 104 and the inner collar wall 232, in an analogous manner to the above-described establishment of an interference fit between the shaft 104 and the substrate aperture 348. When a pulling section 116 was originally present on the bolt 102, it may be used to assist with application of the longitudinally tensile force during insertion of the bolt 102 into either or both of the substrate 346 and the collar 218 and then may be removed as desired, as previously mentioned.

Once the fastener assembly 100 has reached the position shown in FIG. 3C, the substrate at least partially surrounds the shaft body 112 between the collar 218 and the head 106. The distal shaft end 110 of the bolt 102 has been extended into the collar aperture 226 with the bondable portion 114 of the shaft body 112 being at least partially located lateral to the bondable portion 234 of the inner collar wall 232. Optionally, though not shown, the shaft 104 may have been inserted into a spring washer aperture 238 to interpose a spring washer 236 longitudinally between the inner collar wall 232 and the distal substrate surface 230. Also optionally, though not shown, the shaft body 112 may have been extended through an insulating washer aperture 242 to interpose an insulating washer 240 longitudinally between the inner collar wall 232 and the distal substrate surface 230. As previously mentioned, one of ordinary skill in the art could provide as many of collars 218a, 218b, and/or 218c, or other structures providing similar functions, to the fastener assembly 100 as desired. For clarity, however, a single straight collar 218a is shown as comprising the fastener assembly 100 in conjunction with the bolt 102.

Figure 4B:
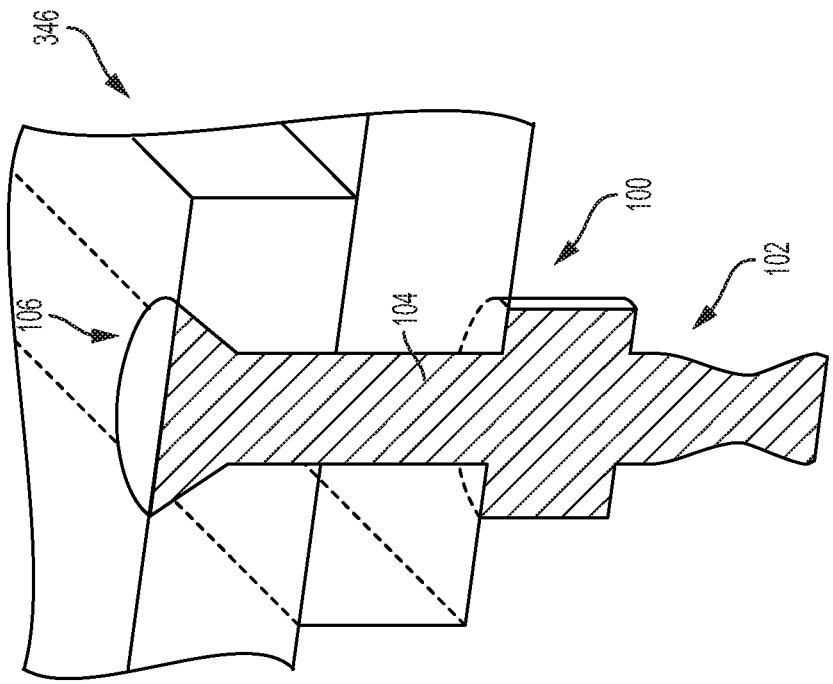
FIGS. 4A-4B schematically depict a portion of a sequence of operation of the aspect of FIG. 1.
Figure 4A:
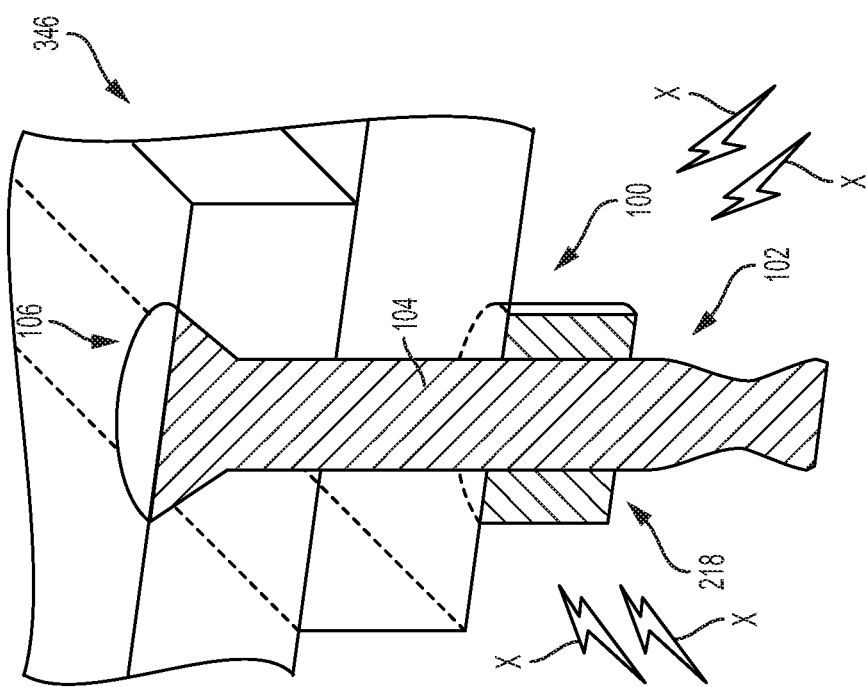

Turning now to FIGS. 4A-4B, the bondable material of both of the bondable portion 114 of the shaft body 112 and the bondable portion 234 of the inner collar wall 232 is shown as being activated, in any suitable manner, such as by application of heat and/or pressure (indicated schematically at "X" in FIG. 4A) in a diffusion bonding process. This diffusion bonding activation of the bondable material bonds the shaft 104 and the collar 218 into an integral fastener assembly 100 structure, as shown in FIG. 4B. The term "integral" is used herein to indicate that the so-described structures may originally have been comprised of various pieces at some time(s) during the manufacturing and installation process, but these separate components or subassemblies are assembled into a unitary or monolithic whole, not intended for later disassembly, by the time the production/manufacturing and installation work is complete. A "unitary whole" is, similarly, a one-piece item which is self-contained and complete as a single piece when completely installed and which the user is not expected to further assemble or disassemble but simply to handle and use as a one-piece structure. While it is possible that the integral fastener assembly 100 structure formed by diffusion bonding of the bondable material could be forcibly separated, such separation is not desired or contemplated, and would effectively amount to breaking the single-piece completed/installed fastener assembly 100 structure into multiple pieces, rather than any sort of intended disassembly.

Three non-limiting examples of suitable activation schemes for the bondable material are thermal expansion, direct pressure, and press fit. In thermal expansion, the collar 218 may be heated to a temperature approaching the diffusion bonding temperature. This results in an expansion of the collar 218, and as a result, a loose sliding fit during insertion of the distal shaft end 110 into the collar aperture 226. Once the bolt 102 and collar 218 are positioned as desired, at least a portion of the bolt 102 is heated close to the temperature of the collar 218, thus expanding the shaft body 112 into an interference fit with the inner collar wall 232. As the coefficient of thermal expansion will be known for the materials of these components, and the diameter tolerances can be relatively tightly controlled due to the ease of molding and manufacturing present in the bondable material(s), contact pressure at the interference surface between the shaft body 112 and the inner collar wall 232 can be consistently controlled and targeted. Upon cooling, the bolt 102 will naturally shrink in length, thus increasing clamp up forces without for high deformation required during install.

In the direct pressure ("retainer crush") installation scheme, a mechanism similar to those used for existing swaged fasteners can be used to directly apply force to crush the collar 218 into place. In this scheme, the swaging pressure can be applied to install the collar 218 onto the bolt 102 under preload and maintain a suitable crushing force through the heat cycle used to activate the bondable material.

In the press fit ("conic fit") installation scheme, the bondable portion 114 of the shaft body 112 may be designed with a slight taper, with grip height variation due to structure tolerances being kept to a minimum. The collar 218 can then be pressed into place with desired pressure ("interference fit") between the collar 218 and bolt 102 occurring due to specific configuration of the taper and/or other affected structures of the fastener assembly 100.

In any of these, or any other bonding scheme, the bondable material of both of the bondable portion 114 of the shaft body 112 and the bondable portion 234 of the inner collar wall 232 should be heated to about 50-75% of the material melting temperature, applied under sufficient pressure to activate the diffusion bonding process for the bondable material. To prevent damage to the often temperature-sensitive substrate 346 structure(s), inductive heating of the bondable material may be used. Inductive heating allows for fast, localized heating while minimizing thermal transfer to surrounding materials. In order to reduce thermal transfer further, an air gap 244 could be established longitudinally between the inner collar wall 232 and the distal substrate surface 352 (or any other longitudinally stacked components) to provide thermal insulation that further minimizes thermal transfer into the local structure during activation of the bondable material. As another option for reducing thermal transfer during activation of the bondable material, a thermal insulating material or structure (not shown) could be longitudinally placed (in addition to or instead of any air gap 244) between the inner collar wall 232 and the distal substrate surface 352. Further, cooling measures (e.g., quenching, irrigating, cooling fluids, or the like) could be applied, once diffusion bonding has sufficiently occurred, to reduce unwanted thermal transfer. For example, a clamping tool which is used in applying an activation pressure could be configured to serve as a heat sink, optionally with the assistance of internal active cooling features (e.g., water lines).

Regardless of the way in which the bondable material is activated, however, activation of the bondable material of both of the inner collar wall 232 and the shaft body 112 will bond the shaft 104 and the collar 218 into an integral fastener assembly 100 structure.

Once the fastener assembly 100 has been installed as described, the substrate 346, or portions thereof, is held together by the fastener assembly 100, and the substrate 346 can pass on to further manufacturing procedures and/or be used as otherwise desired. Optionally, the integral fastener assembly 100 structure, or parts thereof, could act to hold at least two of the head 106 of the bolt 102, the proximal substrate surface 350, the distal substrate surface 352, and the proximal collar surface 228 in mutual compressive contact.

Bondable material, such as amorphous metals, can be easily cast. Due to their relatively low working temperatures, casting per-part cycle times can be significantly reduced compared to traditional metals. In addition, amorphous metal parts can be produced through an injection molding process that is easily repeatable through use of prefabricated molds. Particular molded shapes may be easily swapped in and out of production, as orders demand, due to the ability to use stored molds (rather than the relatively more cumbersome casting processes. Retooling of multiple machines with detailed quality assurance steps between each would not be needed through use of bondable materials, as would be required for casting of traditional metals.

Molded bondable material parts can easily be made in non-revolved shapes (which is difficult to do with machined, traditional metal parts), which may help to prevent unwanted rotation of a fastener within an assembly due to vibration and shock. Amorphous metal offers higher elongation before fracture than do traditional metals, thus increasing the preload capability of a diffusion bonded fastener.

A diffusion bonded joint acts essentially as a weld, approaching comparable strength to the parent materials. As such, the amount of surface contact required for a needed strength is reduced, thus decreasing the necessary size and number of fastener assemblies 100 that would be "overdesigned" if traditional fasteners were used. That is, because of the "welded" interface at the diffusion bonded surface, creep and inconsistent clamping pressure are avoided. More consistent clamping pressures allow for fasteners to be used closer to their ultimate strength, allowing for smaller and/or fewer fasteners to be used given a required loading system.

The alloys used in amorphous metals and other bondable materials should have a sufficiently low melting temperature to allow for adequately fast cooling during molding to solidify without grain structure. Diffusion bonding occurs at a temperature typically in the 50-75% of melting temperature range of the to-be-bonded material(s). Due to the reduced melting temperature of the bondable material fastener assembly 100, diffusion bonding can be performed at a temperature low enough to avoid compromising temperature-sensitive substrate 346 components (e.g., composites) or to effect temper in metallic substrate 346 components.

Threaded and swaged fasteners both rely on a thread or tooth geometry that is difficult to accurately cast in traditional metals and thus is normally machined into the cast blanks, adding time and cost to the production process. However, cast or molded bondable material components can faithfully reproduce surface finish to an Ra value at, or even below, desired surface roughness for diffusion bonding. As-cast bondable material components need not be post-machined to achieve surface conditions conducive to successful diffusion bonding.

While a collar 218 is described above as being a separately provided portion of the fastener assembly 100, it is also contemplated that at least a portion of the substrate 346 itself may function as a collar 218, without provision of a separate collar 218 component. In such instance, the substrate aperture 348, or some portion of an inner wall thereof, may be at least partially formed of a bondable material for diffusion bonding to the bondable portion 114 of the shaft 104 as described. The shaft 104 would be inserted into the substrate aperture 348 as desired, including the optional use of a pulling section 116 for the application of longitudinally tensile force as described, and then the bondable material of the bondable portion 114 of the shaft 104 will be activated, along with the bondable material of the inner wall of the substrate aperture 348, to attach the bolt 102 directly to the substrate 246 as an integral structure. Optionally, in this situation, the substrate aperture 348 could be a blind hole (not shown), which could include bondable material at/near a bottom surface thereof for diffusion bonding to the bolt 102.

While aspects of this disclosure have been particularly shown and described with reference to the example embodiments above, it will be understood by those of ordinary skill in the art that various additional embodiments may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. Any of the described structures and components could be integrally formed as a single unitary or monolithic piece or made up of separate sub-components, with either of these formations involving any suitable stock or bespoke components and/or any suitable material or combinations of materials; however, the chosen material(s) should be biocompatible for many applications. Any of the described structures and components could be disposable or reusable as desired for a particular use environment. Any component could be provided with a user-perceptible marking to indicate a material, configuration, at least one dimension, or the like pertaining to that component, the user-perceptible marking aiding a user in selecting one component from an array of similar components for a particular use environment. The shaft 104 could fit relatively loosely within the substrate aperture 348, allowing some degree of relative motion therebetween even after the installation of the fastener assembly 100 is finished. A "predetermined" status may be determined at any time before the structures being manipulated actually reach that status, the "predetermination" being made as late as immediately before the structure achieves the predetermined status. All insertions described herein may be accomplished by any desired relative movement of the components, and any directions or descriptions of particular movements are used herein merely for clarity of description, and are not intended or operative to limit the movement, or stasis, of the components in an absolute frame of reference. Though certain components described herein are shown as having specific geometric shapes, all structures of this disclosure may have any suitable shapes, sizes, configurations, relative relationships, cross-sectional areas, or any other physical characteristics as desirable for a particular application. While an aircraft use environment is given as an example here to aid discussion, the fastener assembly can be used in any desired use environment, and may be configured by one of ordinary skill in the art for a particular use environment. Any structures or features described with reference to one embodiment or configuration could be provided, singly or in combination with other structures or features, to any other embodiment or configuration, as it would be impractical to describe each of the embodiments and configurations discussed herein as having all of the options discussed with respect to all of the other embodiments and configurations.

A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. A method of installing a fastener assembly on a substrate having a longitudinally oriented substrate aperture extending through a thickness thereof between proximal and distal substrate surfaces, the method comprising:
   providing a bolt having a shaft and a head, the shaft having proximal and distal shaft ends longitudinally separated by a shaft body, the head being located at the proximal shaft end, and at least a bondable portion of the shaft body spaced from the proximal shaft end being at least partially made of a bondable material;
   inserting the distal shaft end of the bolt longitudinally into the substrate aperture from the proximal substrate surface, including
   applying a longitudinally tensile force to the shaft to reduce a lateral cross-sectional area of the shaft and thereby facilitate the insertion of at least a portion of the shaft through the substrate aperture;
   extending the distal shaft end of the bolt from the distal substrate surface with at least a portion of the bondable portion of the shaft body being located distal to the distal substrate surface;
   providing at least one collar having proximal and distal collar ends longitudinally separated by a collar body, the collar body including a longitudinally oriented collar aperture extending through a thickness thereof between proximal and distal collar surfaces, the collar aperture defining an inner collar wall having a bondable portion which is at least partially made of a bondable material;
   inserting the distal shaft end of the bolt longitudinally into the collar aperture from the proximal collar surface;
   wherein a longitudinally tensile force is selectively applied to the shaft during placement of the shaft at least partially within the collar to facilitate an interference fit between the shaft and the inner collar wall; and
   extending the distal shaft end of the bolt into the collar aperture with the bondable portion of the shaft body being at least partially located lateral to the bondable portion of the inner collar wall;
   activating the bondable material of both of the inner collar wall and the shaft body; and bonding the shaft and the collar into an integral fastener assembly structure through diffusion bonding activation of the bondable material.

2. The method of claim 1, wherein inserting the distal shaft end of the bolt longitudinally into the collar aperture from the proximal collar surface includes bringing the proximal collar surface and the distal substrate surface into compressive contact.

3. The method of claim 1, including:
   providing a spring washer having a spring washer aperture extending longitudinally therethrough; and
   inserting the shaft into the spring washer aperture to interpose the spring washer longitudinally between the inner collar wall and the distal substrate surface.

4. The method of claim 1, including, once at least a portion of the shaft is located laterally within the substrate aperture, releasing the longitudinally tensile force from the shaft to facilitate an interference fit between the shaft and an inner wall of the substrate aperture.

5. The method of claim 1, wherein providing a bolt having a shaft and a head includes providing a pulling section at the distal shaft end and including:
- applying a longitudinally tensile force to the shaft via interaction of a tension source with the pulling section;
- with the longitudinally tensile force, reducing a lateral cross-sectional area of the shaft and thereby facilitate the insertion of at least a portion of the shaft through the substrate aperture.

6. The method of claim 5, including, once at least a portion of the shaft is located laterally within the substrate aperture, releasing the longitudinally tensile force from the shaft to facilitate an interference fit between the shaft and an inner wall of the substrate aperture.

7. The method of claim 6, including, once the interference fit is established between the shaft and an inner wall of the substrate aperture, removing the pulling section from the distal shaft end.

8. The method of claim 1, including thermally insulating the proximal collar surface from the distal substrate surface during activation of the bondable material of at least one of the shaft body and the inner collar wall.

9. The method of claim 1, wherein the inner collar wall is smooth, and wherein extending the distal shaft end of the bolt into the collar aperture includes longitudinally sliding the distal shaft end of the bolt into the collar aperture.

10. The method of claim 1, wherein a "bondable material" is a material which is amenable to attachment to another material via a diffusion bonding process.

11. The method of claim 10, wherein activating the bondable material does not encompass activating a strictly adhesive connection which does not use a bondable material.

* * * * *